United States Patent [19]

Nishino et al.

[11] Patent Number: 5,001,744
[45] Date of Patent: Mar. 19, 1991

[54] COMMUNICATION SYSTEM HAVING A FIRST AND SECOND COMMUNICATION PROCEDURES

[75] Inventors: Tsutomu Nishino, Yokohama; Osamu Hirata, Tokyo; Shoji Suzuki, Atsugi; Masaki Hara, Tokyo; Shinji Tsuchida, Zama; Minoru Ogata, Yokohama, all of Japan

[73] Assignee: Canon Kabushiki Kaisha, Tokyo, Japan

[21] Appl. No.: 277,568

[22] Filed: Nov. 29, 1988

[30] Foreign Application Priority Data

Dec. 1, 1987 [JP] Japan .................. 62-183298
Dec. 16, 1987 [JP] Japan .................. 62-316002

[51] Int. Cl.$^5$ .......................................... H04M 11/00
[52] U.S. Cl. ......................................... 379/93; 379/97; 358/436
[58] Field of Search ............... 379/93, 96, 97, 98, 379/100; 358/436, 442

[56] References Cited

U.S. PATENT DOCUMENTS

| | | | |
|---|---|---|---|
| 4,340,783 | 7/1982 | Sugiyama et al. | 379/100 |
| 4,524,244 | 6/1985 | Faggin et al. | 379/93 |
| 4,660,218 | 4/1987 | Hashimoto | 379/93 |
| 4,677,660 | 6/1987 | Yoshida | 379/100 |
| 4,685,123 | 8/1987 | Hsia et al. | 379/93 |
| 4,800,439 | 1/1989 | Yoshino | 358/257 |
| 4,815,121 | 3/1989 | Yoshida | 379/93 |
| 4,816,911 | 3/1989 | Kirsh et al. | 358/400 |
| 4,821,312 | 4/1989 | Horton et al. | 379/97 |
| 4,850,008 | 7/1989 | Berg et al. | 379/100 |

FOREIGN PATENT DOCUMENTS

8707802 12/1987 World Int. Prop. O. .......... 379/100

OTHER PUBLICATIONS

M. Setoguchi, "Facsimile Data Converter Applied to Various Data Communications Series", JTR, Jan. 1987, pp. 22-28.

*Primary Examiner*—Jin F. Ng
*Assistant Examiner*—Wing F. Chan
*Attorney, Agent, or Firm*—Fitzpatrick, Cella, Harper & Scinto

[57] ABSTRACT

Disclosed is a communication system which accommodates at least one central office network line and a plurality of extensions, and which is adapted to control line connection between the central office network line and plurality of extensions. When a call from the central office network line is detected, it is determined in response to the call whether a control signal characteristic of data communication, such as a CST signal, is being sent by the other party's device. If such a control signal is being sent, a line to which a data processor is connected is selected and connected to the calling line. This makes it possible to connect an information processor and a telephone to a common central office network line, and to connect a call answered by another telephone to a desired information processor rapidly through a simple operation. Accordingly, it is unnecessary to assign a special-purpose central office network line to an information processor. When the information processor is not in use, therefore, another telephone may employ the same line. This improve the efficiency of line utilization.

8 Claims, 16 Drawing Sheets

MCI : MODEM FUNCTION DISPLAY SIGNAL (V27 TER 2400BPS)

←———— ABOUT 1.3 SEC ————→

TRAINING : LONG TRAINING SIGNAL (WITH SPEAKER ECHO)
F : FLAG FIELD
A : ADDRESS FIELD
C : CONTROL FIELD
TIF : TERMINAL FUNCTION INFORMATION FIELD
FCS : FLAG CHECK SEQUENCE

SIGNAL FORMAT AND COMMUNICATION SPEED OF CONTROL SIGNAL RELATED TO JUST-PC COMMUNICATION

FIG. 15 (A)

MFI : MODEM FUNCTION COMMUNICATION SIGNAL (V27 TER 2400BPS)

←———— ABOUT 1.3 SEC ————→

TRAINING : LONG TRAINING SIGNAL (WITH SPEAKER ECHO)
F : FLAG FIELD
A : ADDRESS FIELD
C : CONTROL FIELD
TIF : TERMINAL FUNCTION INFORMATION FIELD
FCS : FLAG CHECK SEQUENCE

SIGNAL FORMAT AND COMMUNICATION SPEED OF CONTROL SIGNAL RELATED TO JUST-PC COMMUNICATION

FIG. 15 (B)

DIS: DIGITAL IDENTIFICATION SIGNAL (V21, 310BPS)

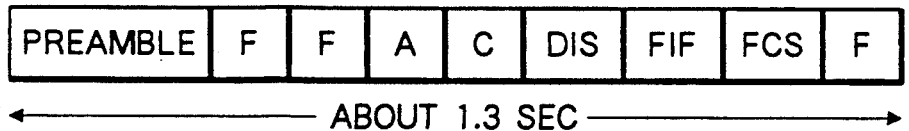

←—————— ABOUT 1.3 SEC ——————→

PREAMBLE : CONTINUOUS TRANSMISSION OF FLAG (1 SEC)
F : FLAG FIELD
A : ADDRESS FIELD
C : CONTROL FIELD
FIF : TERMINAL FUNCTION INFORMATION FIELD
FCS : FLAG CHECK SEQUENCE

SIGNAL FORMAT AND COMMUNICATION SPEED OF CONTROL SIGNAL RELATED TO FAX COMMUNICATION

FIG. 16 (A)

DCS: DIGITAL COMMAND SIGNAL (V21, 300BPS)

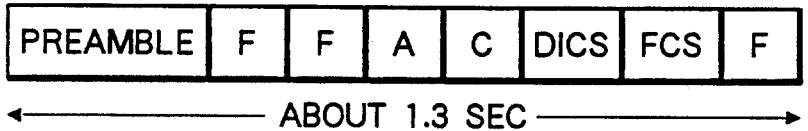

←—————— ABOUT 1.3 SEC ——————→

PREAMBLE : CONTINUOUS TRANSMISSION OF FLAG (1 SEC)
F : FLAG FIELD
A : ADDRESS FIELD
C : CONTROL FIELD
FIF : TERMINAL FUNCTION INFORMATION FIELD
FCS : FLAG CHECK SEQUENCE

SIGNAL FORMAT AND COMMUNICATION SPEED OF CONTROL SIGNAL RELATED TO FAX COMMUNICATION

FIG. 16 (B)

COMMUNICATION SYSTEM HAVING A FIRST AND SECOND COMMUNICATION PROCEDURES

BACKGROUND OF THE INVENTION

1. Field of the Invention

This invention relates to a communication system having a plurality of communication procedure control functions.

Further, the invention relates to a communication system comprising a telephone control unit which accommodates at least one central office network line and a plurality of extensions, and which is adapted to control line connection between the central office network line and the plurality of extensions, telephones connected to the extensions, and at least one data processor connected to the extensions.

2. Description of the Prior Art

By virtue of a reduction in cost and an improvement in the capability of modern information processors, it has now become possible to install these information processors (e.g., personal computers) in ordinary offices. Moreover, these devices can be connected to other computers via central office network lines to make possible the retrieval and exchange of information.

In the prior art, however, these information processors are connected to pay station lines dedicated to special equipment separate from the other telephone equipment located in the office. Moreover, in most cases these processors are equipped with private telephones and calls are both sent and received via dedicated lines therefor. Even when a call is received a response is made separately by the telephones dedicated to the aforementioned equipment provided on the information processors or installed in the vicinity thereof, and when necessary a line is switched over from a telephone to the information processor side by a manual operation. Alternatively, a received call is answered in the form of an overall-data transmission without providing for a telephone.

Consequently, when the information processors are not being used these idle lines cannot be employed by the other telephones. This represents a significant waste.

In an effort to solve this problem, it has become possible to connect a signal information processor to the extensions of a telephone control unit which performs network control between the telephones and lines, and transfer the call of a response by another telephone under well-known telephone transfer control.

In the transfer processing, however, it is necessary first to search for the extension telephone number already assigned to the information processor, then input the pertinent extension telephone number and execute actual transfer processing. With this arrangement, extremely complicated processing cannot be avoided and the response timer of the information processor on the calling side can run out of time and result in the call being disconnected, thereby running up an unnecessary telephone fee.

There is known in the art a communication device having two communication control functions, namely a communication procedure control function in accordance with the "Personal Computer Communication Device Recommendation System" (hereinafter referred to as the "JUST-PC communication system") of Notification No. 971 of the Ministry of Posts and Telecommunications, and a facsimile communication procedure control function.

In a communication device having such a JUST-PC communication procedure control function and a facsimile communication procedure control function, a problem which arises is that after a call is automatically received, it cannot be determined whether the call received from the other party's terminal is a call for the purpose of communication in accordance with the JUST-PC communication system or a call for the purpose of communication in accordance with the facsimile communication system.

SUMMARY OF THE INVENTION

An object of the present invention is to solve the foregoing problems.

According to the present invention, the foregoing object is attained by providing a communication system comprising a telephone control unit which accommodates at least one central office network line and a plurality of extensions, and which is adapted to control line connection between the central office network line and the plurality of extensions, telephones connected to the extensions, and at least one data processor connected to the extensions, characterized in that the telephone control unit is equipped with channel forming means which, when arrival of a call directed to an extension connected to a data communication device is detected, automatically forms a channel between the data processor connection line and a calling line.

In this arrangement, when a call is made to the data processor, the received call can be transferred or connected to this data processor in a simple manner.

In another aspect of the invention, there is provided a system of communication devices capable of being connected to other communication devices via a communication medium, comprising first communication procedure control means for performing communication control through a first communication procedure, second communication procedure control means for performing communication control through a second communication procedure different from that of said first communication procedure, control signal transmitting means for alternately transmitting a communication control procedure in accordance with said first communication procedure and a communication control signal in accordance with said second communication procedure, and discriminating means for discriminating a communication control procedure of another party's communication device based on a transmitted control signal from the other party's device.

In this arrangement, a communication procedure control signal is received from the other party's device and it is possible to automatically distinguish the communication system of the other party's device by alternately transmitting the first communication procedure control signal and the second communication procedure control signal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 15(A) and 15(B) are views showing a control signal format and communication speed used in a JUST-PC communication control procedure of the sixth embodiment; and FIGS. 16(A) and 16(B) are views showing a control signal format and communication speed used in a facsimile communication control procedure of the sixth embodiment.

DESCRIPTION OF THE PREFERRED EMBODIMENTS

Embodiments of the present invention will now be described with reference to the drawings.

First Embodiment

Figure 1:
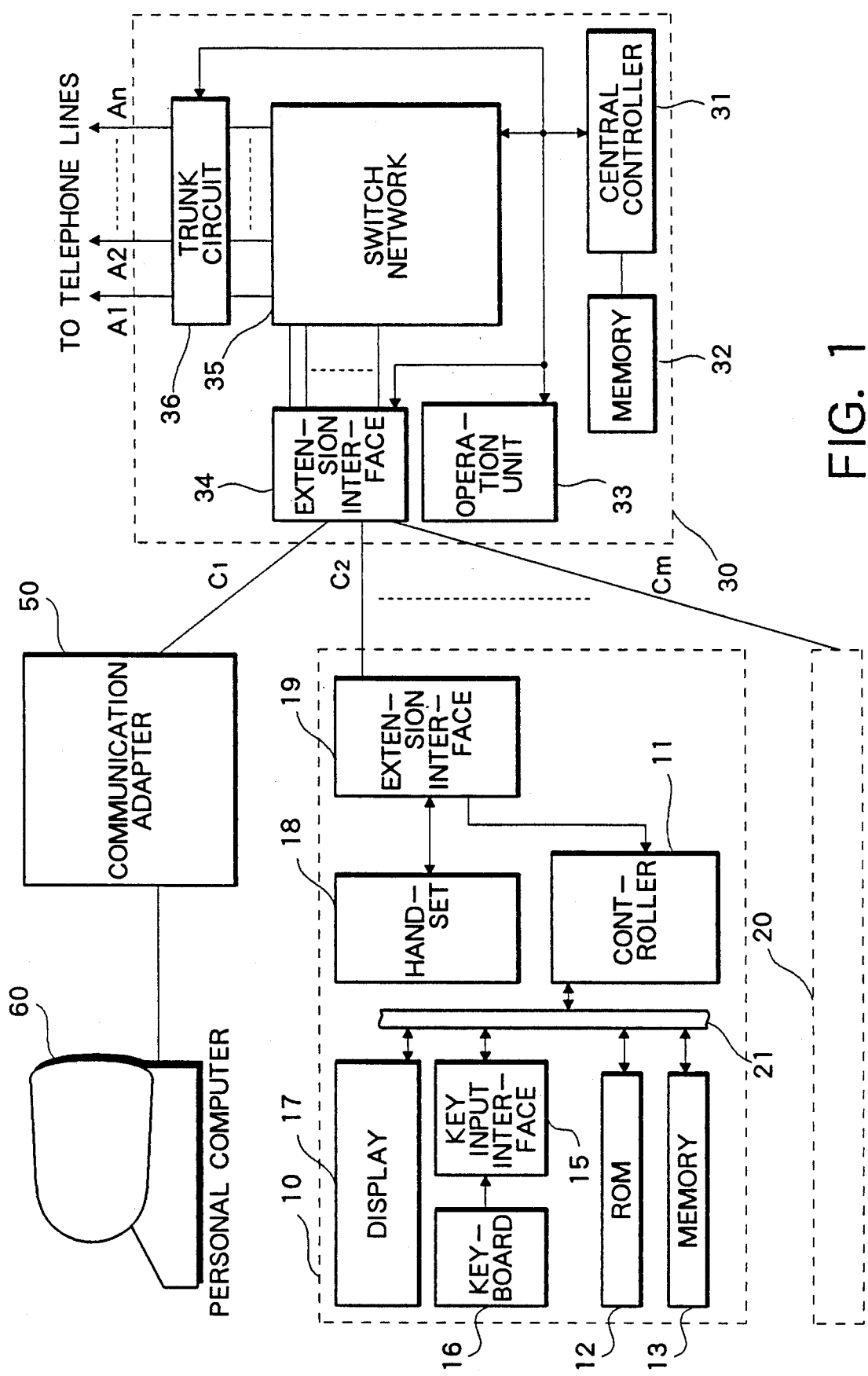
FIG. 1 is a block diagram illustrating the arrangement of a first embodiment of the present invention.

FIG. 1 is a block diagram illustrating a first embodiment of the present invention, in which A1, A2–An denote outside lines connected to a central office network or the like, C1, C2–Cm extensions connected to a main control unit 30, 10 and 20 telephones connected to the extensions C2–Cm, and 50 a communication adapter which interfaces a personal computer connected to the extension C1 and the telephone lines. The communication adapter 50 may be incorporated within the personal computer 60 or arranged in a separate casing. It is also possible to adopt an arrangement in which a private telephone is connected to the communication adapter 50. This will make it possible to place a call directly to an outside line from the location of the personal computer 60 or to communicate with a telephone connected to another extension. In this embodiment, the personal computer 60 performs data communication control through a control procedure in accordance with the JUST-PC protocol, using the telephone lines. However, the control procedure is not limited to this control procedure; any control procedure can be adopted.

Since the telephones connected to the extensions all have the same construction, only the telephone 10 will be described as typical example.

The telephone 10 includes a controller 11 for executing overall control of the telephone of this embodiment in accordance with a program (described hereinbelow) stored in an internal ROM 12, which stores various parameters in addition to the abovementioned program, a read/write memory 13 for storing telephone operating state, a key input interface 15 for interfacing a keyboard 16, the keyboard 16, which comprises a ten-key pad for inputting telephone numbers, a transfer key and a personal computer communication changeover key 16a, a display 17 for displaying various states under the control of the main control unit 30, a handset 18, an extension interface 19 for interfacing the telephone and the line of the main control unit 30, and an internal bus 21 for connecting the controller 11 with the other components.

The main control unit 30, which executes line connection control and extension connection control between a plurality of pay lines (outside telephone lines) and a number of extension telephones, includes a central controller 31 for executing overall control of the main control unit 30 in accordance with a program (described hereinbelow) stored in a memory 32, the memory 32 which, in addition to the abovementioned program, stores various parameters and various control data for each extension telephone, an operation unit 33 for initial setting of a telephone number of an extension telephone connected to the personal computer 60 of the main control unit, and for performing input of a manual control designation, an extension interface 34 for administering line interfacing between telephones, a switch network 35 for effecting connection/changeover between the outside telephone lines (pay stations) and the extension telephones, and a trunk circuit 36 for interfacing the outside telephone lines.

Figure 2:
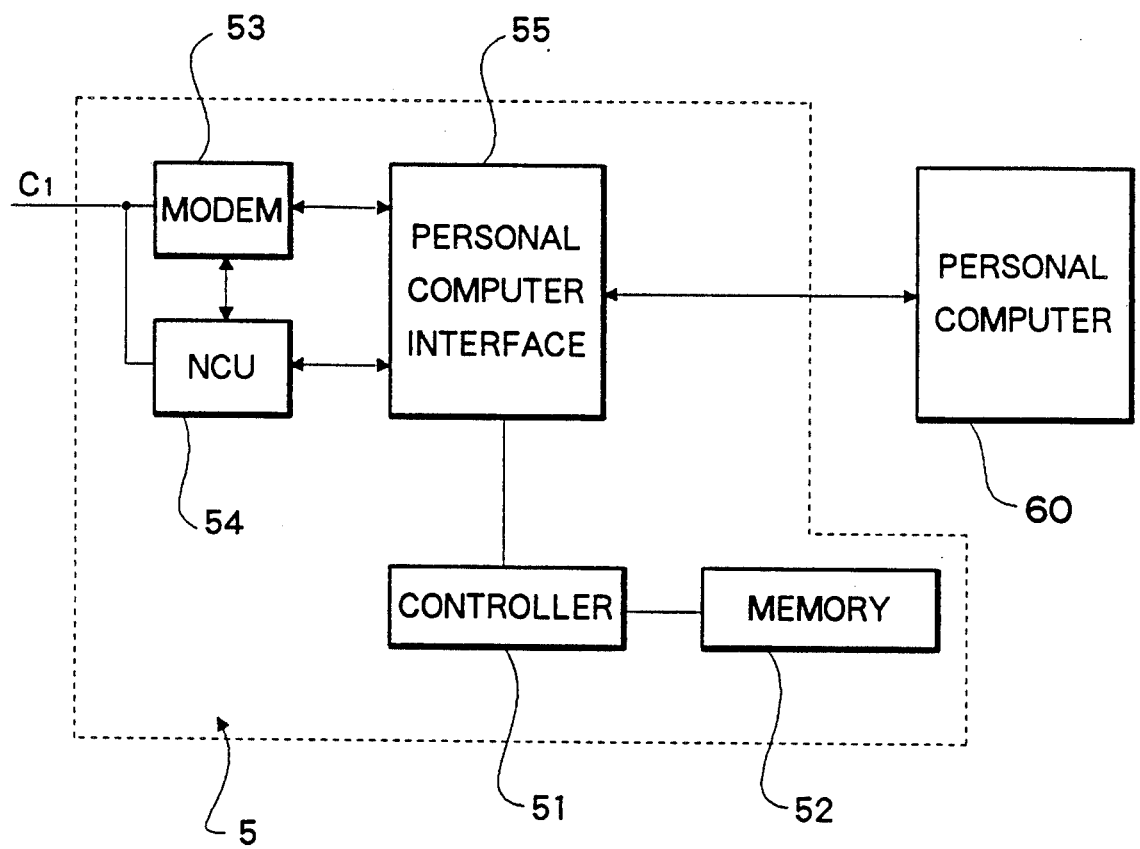
FIG. 2 is a detailed block diagram of a communication adapter shown in FIG. 1.

FIG. 2 shows the details of construction of the communication adapter 50.

The communication adapter 50 includes a controller 51 for performing overall control of the device in accordance with a program in a memory 52. The memory 52 is for temporarily preserving received data from a modem 53 and transmission data in addition to the abovementioned program, and for storing various parameters. The modem 53 is for demodulating modulated data from the extension C1, and for modulating transmission data and sending the data out on the extension C1. The adapter 50 also includes a network control unit (NCU) 54 which performs extension connection control. If required, a private telephone can be connected to the NCU 54. Further, the adapter 50 is provided with a personal computer interface 55 for interfacing this device with the personal computer 60.

The modem 53 of this embodiment is a short training model having a transmission speed of 2400 bps, without echo protection.

In a case where the communication adapter 50 is incorporated within the personal computer 60, the controller 51 and memory 52 would not be dedicated solely to the communication adapter 50 but could be arranged to be shared with a control section of the personal computer for other control purposes.

Figure 3:
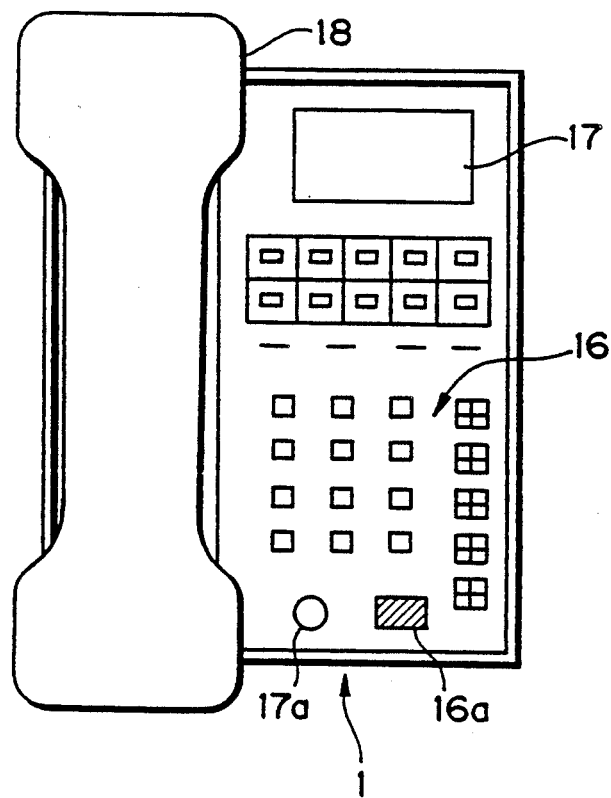
FIG. 3 is a plan view showing a telephone of the first embodiment of the invention.

FIG. 3 is a view showing the outside appearance of the keyboard 16 and display 17 of the extension telephone.

Numeral 16a denotes the aforementioned personal computer communication changeover key. When a received call is for the personal computer 60 in a case where this telephone answers the call, the key 16a is touched once to transfer the connected call to the personal computer 60. Numeral 17a denotes a personal computer communication lamp.

Figure 4:
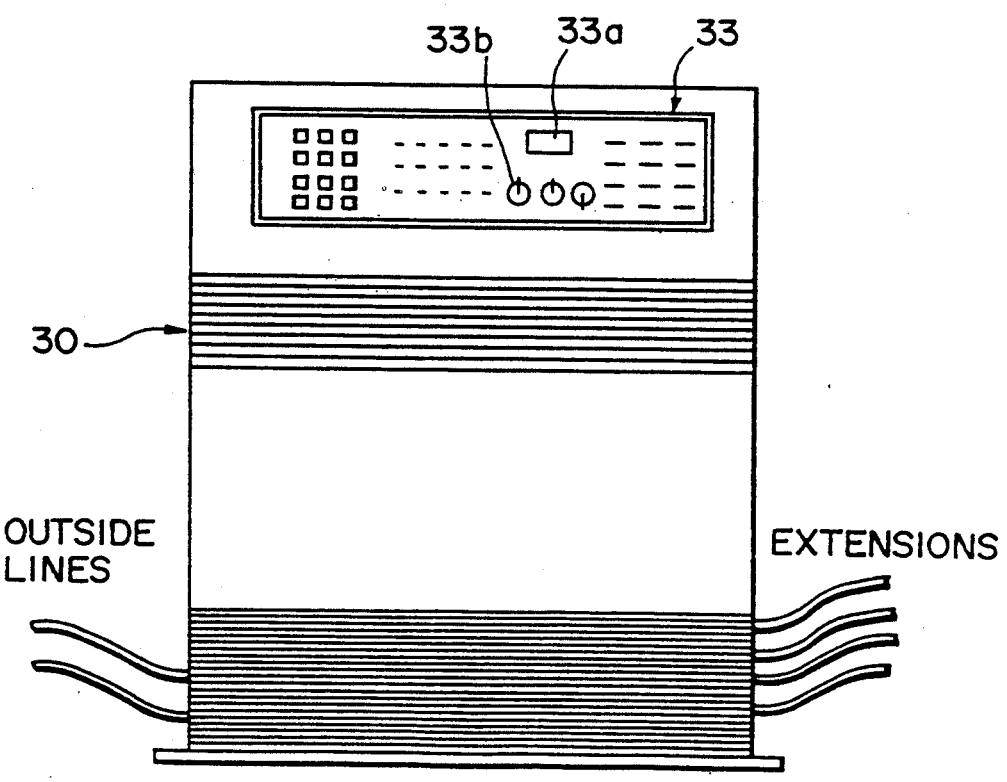
FIG. 4 is a plan view of a main control unit of the first embodiment.

FIG. 4 shows the external appearance of a control panel for the operation section 33 of main control unit 30.

In FIG. 4, numeral 33a denotes a personal computer communication changeover key. When a received call is for the personal computer 60, the key 33a is touched once to transfer the connected call to the personal computer 60. Numeral 33c denotes a personal computer communication lamp.

Control in accordance with this embodiment constructed as set forth above will now be described with reference to the flowchart of FIG. 5.

When power is first applied to the main control unit 30 (i.e., when the main control unit 30 is installed), the telephone number of the connected extension telephone of communication adapter 50 is inputted from the control panel of the operation section 33 and stored in the memory 32 at a step S1. Further, initial setting processing is executed such as output/non-output of the outside line transmission limit range of the telephones connected to the extensions and of a ringing tone for a call from an outside line for each extension. When this initially setting has been performed, the program proceeds to a step S2, at which it is determined whether a call is received from any outside line and whether this has been sensed by the trunk circuit 36. If there is no received call, the program proceeds to a step S3, at which it is determined whether a call request has been issued by a telephone connected to any connection extension (i.e., whether a DC loop to the extension has been formed by taking the handset 18 off the hook), and whether this has been sensed by an extension telephone.

If there is no call request, the program returns to the step S2. If there is a call request, the program returns to a step S4, at which well-known call processing is executed. If there is an extension connection request, a channel is formed with the desired designated extension. If there is an outside line connection request, transmission control for connecting the requesting extension and an idle outside line is performed in accordance with the transmission limit information.

If a call signal (calling indicator) is detected, the program proceeds from the step S2 to a step S5, where a ringing tone is outputted to the designated telephone, and then to a step S6, at which a response (unhooking of the handset) from the connected domestic telephone is awaited. If the caller releases the line immediately before there is a response from the telephone, the processing of the main control unit 30 returns to the step S2. When any telephone answers a call and the handset 18 is taken off the hook, the program proceeds to a step S7, at which the switch network 35 is controlled to form a channel between the connection extension of the answering telephone and the called line, thereby establishing a state in which the two can communicate. Next, it is determined at a step S8 whether there is an input from the personal computer communication changeover key 16a of the answering telephone, or whether there is an input from the personal computer changeover key 33a of the operation section 33. If there is no key input, it is determined at a step S9 whether disconnection of the line owing to completion of communication has been sensed. If communication is still in progress, the program proceeds to a step S10, at which it is determined whether a transfer request has been made, as by input from the transfer key. If there is no transfer request, the program returns to the step S7.

If there is a transfer request, the program proceeds from the step S10 to a step S11, at which well-known transfer processing is excuted to effect a changeover between the designated extension and the requesting extension. When the line is disconnected at the end of communication, the program proceeds from the step S9 to a step S12, at which release processing is executed, such as opening the DC loop formed with the outside line and opening the channel between the connected extension and the outside line. With the line restored to the initial state, the program returns to the step S2.

In a case where the caller communicates by voice when there is a response to a telephone call accompanying a call from an outside line, voice communication proceeds as is. If required, it is permissible to execute transfer processing or the like.

If the calling side is an information processor when there is a response from a telephone, e.g., if the calling side is a device using the JUST-PC protocol, a CST signal producing a distinctive sound and indicating "0" for ten consecutive bytes is transmitted within five seconds of a response. Otherwise, a carrier signal producing a different distinctive sound is transmitted. Consequently, when these signals are heard through the handset 18, this indicates that the personal computer 60 is being called. Accordingly, the answering party presses the personal computer changeover key 16a of the telephone to request that the line which has received the call be connected to the extension C1. This is followed by taking the handset of the hook. When this request is made, it is transmitted from the extension interface 19 of the telephone to the extension interface 34 of the main control unit 30 by a well-known control signal transmission procedure. The processing executed by the main control unit 30 which has received the signal proceeds from the step S8 to a step S15, at which the corresponding outside line and the connected extension of the personal computer are connected. The program then returns to the step S7.

If a case such as one in which telephone number of the connected extension telephone of the personal computer 60 is not stored in the main control unit 30, it is permissible to effect a transfer to the connected extension of the personal computer by ordinary transfer processing.

If, in a case where a call is placed to the personal computer 60, the telephone is located near the main control unit or the telephone does not have the personal computer changeover key 16a and the number of the extension connected to the personal computer is not known, the personal computer communication changeover key 33a of the operation section 33 on the main control unit 33 is pressed, whereby processing similar to that of the step S15 is executed to make the connection to the line which has received the call. In this case, the difference between this line and the other connection lines is made clear as by placing the answering telephone on hold, and the call connected to this line is connected to the connected extension of the personal computer 60, thereby making communication with the personal computer 60 possible.

Network control such as communication control between each extension telephone and the main control unit, as well as between each extension telephone and the telephone line, is well known in the art and is not described here.

In accordance with control thus executed, a line which has received a call and the personal computer can be connected through a simple operation and in rapid fashion when it is recognized that the call is for the personal computer 60. With regard to the extension C1 connected to the personal computer 60, the specifications are substantially the same as those of the outside lines and the arrangement is such that no modification is applied to the received data/transmitted data.

Second Embodiment

In the first embodiment described above, the determination as to whether or not a call is being placed to the personal computer 60 is made by the answering party's listening directly to the tone from the handset 18 of the telephone. However, since the CST signal is a well-known standardized signal, an arrangement can be adopted in which a CST signal detecting circuit is provided within the main control unit, thereby making it possible to automatically determine whether communication is to be made with the personal computer.

Figure 6:
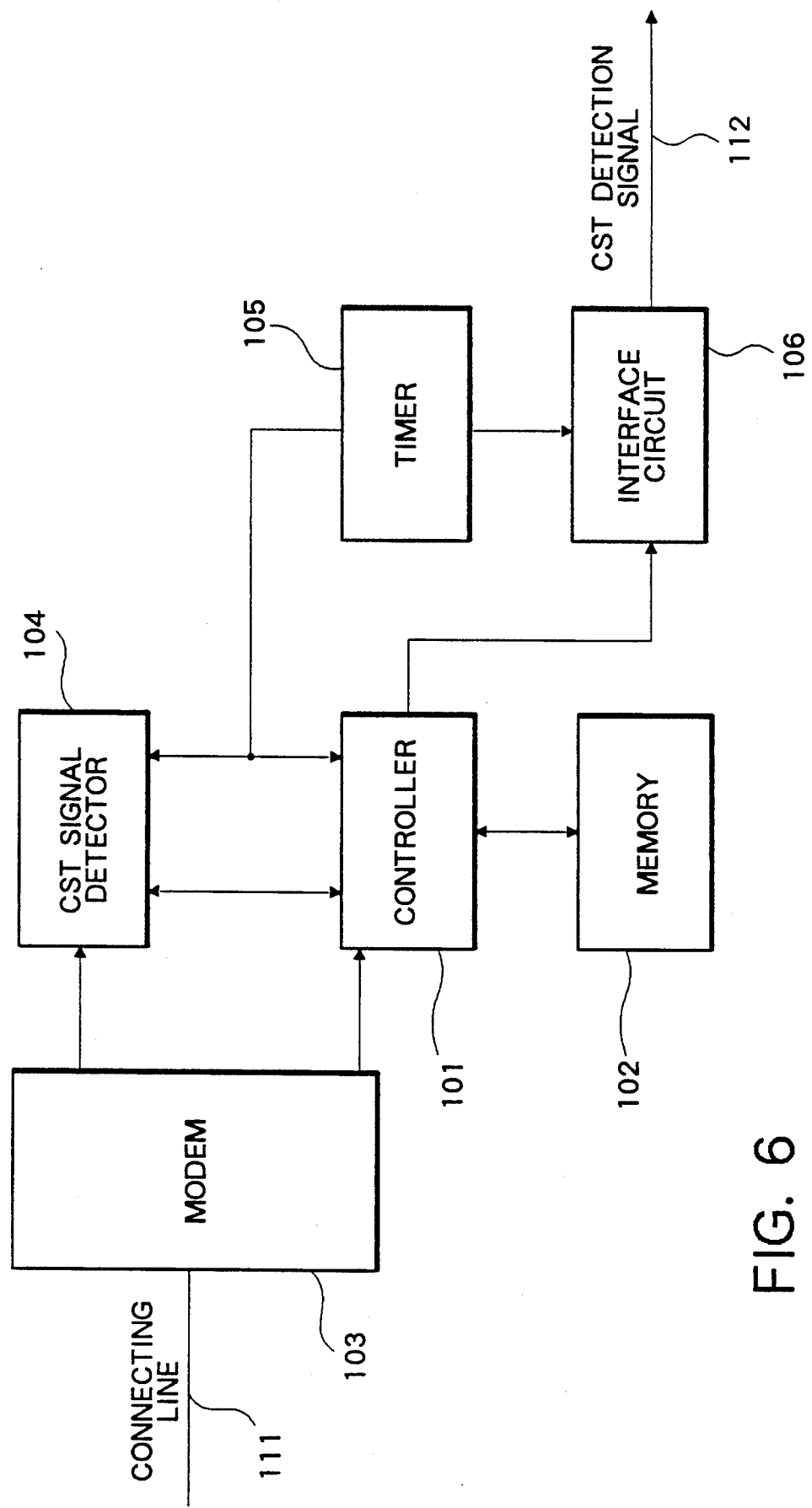
FIG. 6 is a block diagram of a CST signal detecting circuit in a second embodiment of the present invention.

In this case, it will suffice if a personal computer communication detector (a CST signal detector) shown in FIG. 6 is provided within the main control unit 30.

In FIG. 6, numeral 101 denotes a controller for overall control of the device, and 102 a memory for storing signal patterns, which are to be detected in accordance with a communication control procedure decided by a connection information processor, as well as various parameters. Numeral 103 denotes a modem for demodulating received modulated data from a calling line 111, 104 a CST signal detector for detecting a signal, e.g., a CST signal, stored in the memory 102 from the demodulated data provided by modem 103, 105 a timer, and 106 an interface circuit for interfacing the main control unit 30.

The modem 103 is a short training model having a transmission speed of 2400 bps, without echo protection.

Control according to this embodiment for a case where the CST signal detecting circuit is provided will now be described with reference to the flowcharts of FIGS. 7 and 8.

Figure 7A:
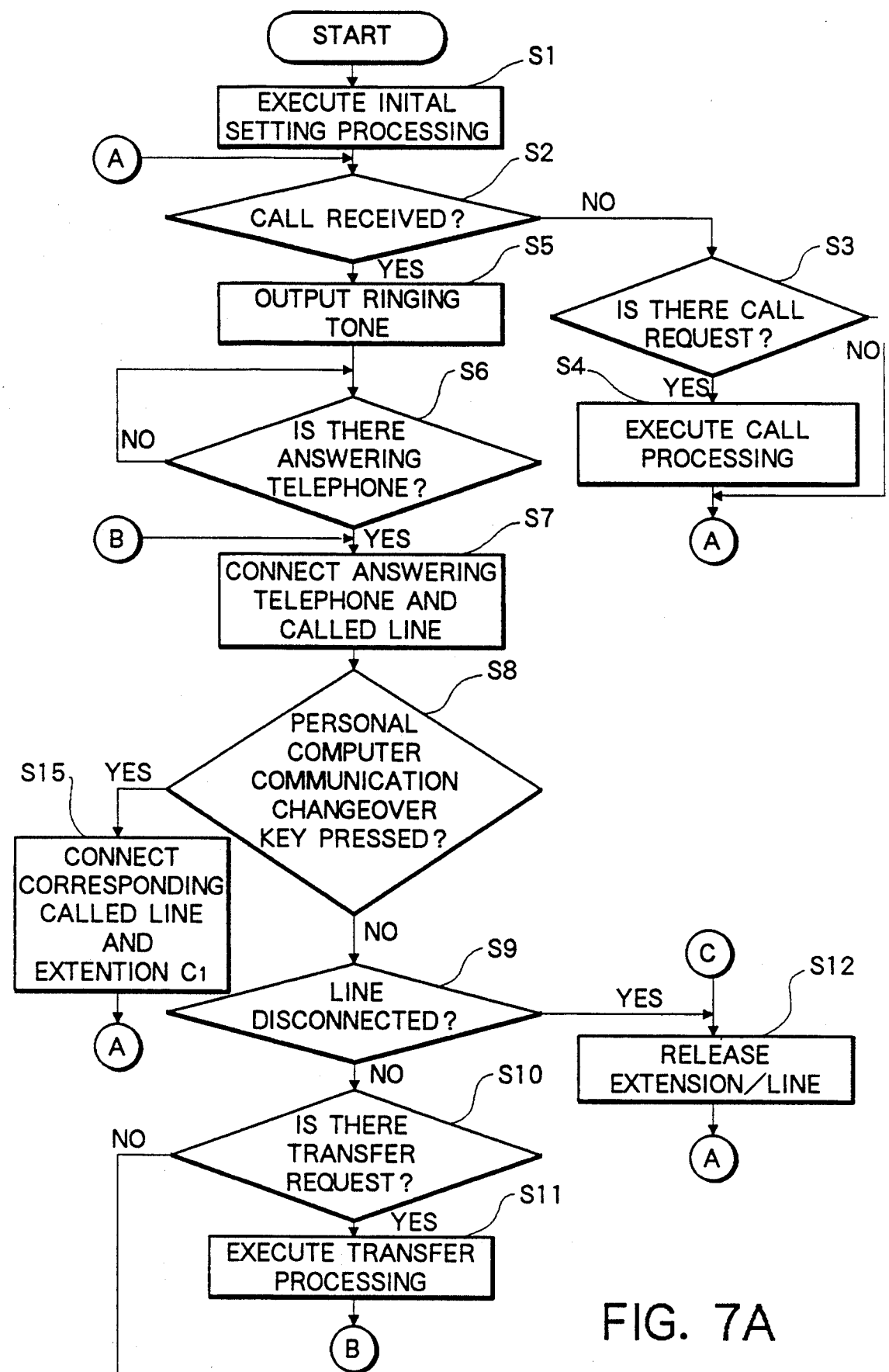
FIGS. 7A and 7B are control flowchart of the main control unit of the second embodiment.
Figure 7B:
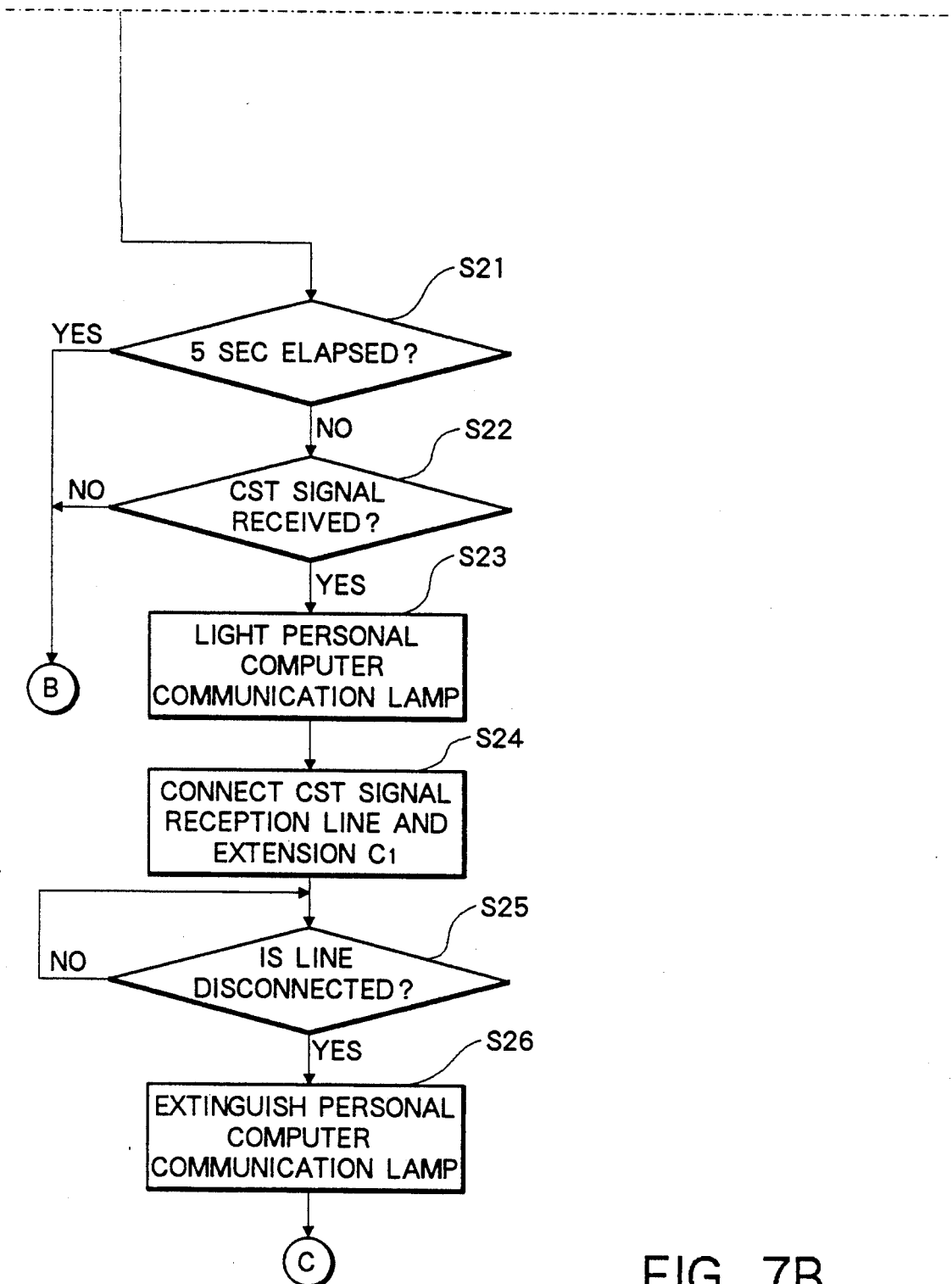
Figure 8:
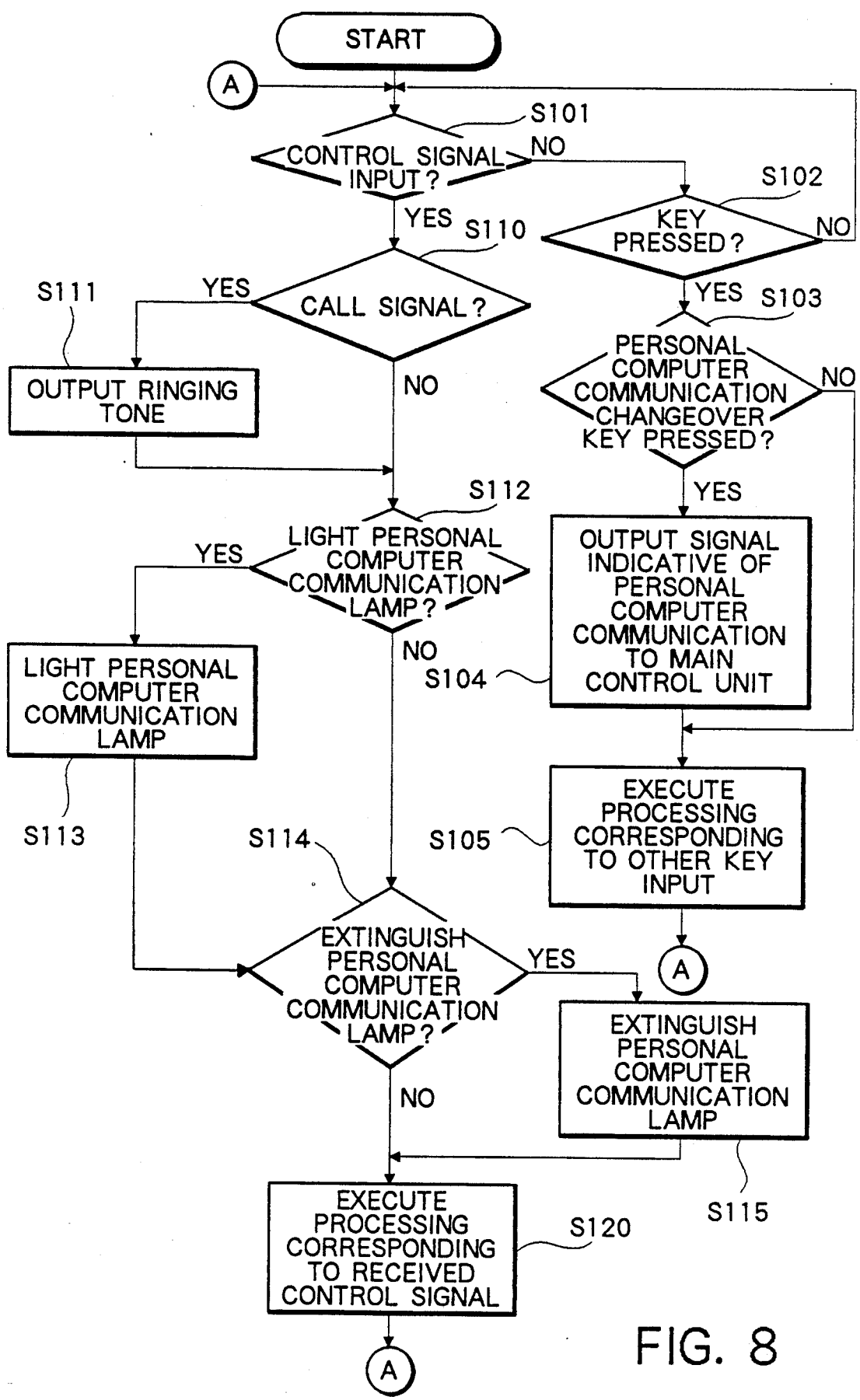
FIG. 8 is a control flowchart of a telephone in the second embodiment.

FIGS. 7A and 7B show a control flowchart of the main control unit 30, and FIG. 8 shows a control flowchart of the telephone.

First, control of the main control unit 30 will be described with reference to FIGS. 7A and 7B. Control which is identical with that of FIG. 5 will not be described again.

When a call is received in this case, the answering telephone and the called line are connected at step S7, thereby forming a channel, if there is a response from the telephone. At the same time, however, the CST signal detecting circuit is activated, a time of five seconds is set in the timer 105 and the timer is caused to start counting time. If no request for a transfer is made at the step S10, the program proceeds to a step S21 and does not return to the step S7. The step S21 checks timing by determining whether the time in timer 105 has run out, namely whether five seconds has elapsed from the moment connection is made to the answering telephone. If the time period of five seconds has elapsed, this means that the incoming call is not for the personal computer 60 and, hence, the program returns to the step S7. If the period of five seconds has not elapsed, it is detected as a step S22 whether the CST signal detector 104 of the CST signal detecting circuit has detected the CST signal, i.e., whether there is an output of a CST detection signal 112 to the central control unit 31 via the interface circuit 106. If the CST detection signal is not arriving, the program returns to the step S7. When the CST signal is detected, the program proceeds to a step S23.

The step S23 calls for a control signal which activates the personal computer communication lamp 17a of the telephone to be sent to the controller 11 via the extension interfaces 34, 19. The personal computer communication lamp 17a is lit, and so is the personal computer communication lamp 33b of the operation section 33 at the same time. It is permissible, however, to adopt an arrangement in which the personal computer communication lamp 33b of the operation section 33 is not lit. Next, at a step S24, a connection is made between the called line on which the CST signal has been detected and the extension C1 to which the personal computer 60 is connected, thereby making communication with the personal computer 60 possible. This is followed by a step S25, at which the end of communication and the disconnecting of the connected line are awaited. When the line is disconnected, the program proceeds to a step S26, at which a control signal for extinguishing the personal computer communication lamp 17a of the telephone is sent to the controller 11 via the extension interfaces 34, 19, thereby extinguishing the personal computer communication lamp 17a. The personal computer communication lamp 33b is extinguished at the same time. The program then proceeds to the step S12 to release the line.

Control of the extension telephones connected to the extensions C2-Cm will now be described with reference to FIG. 8.

The controller 11 determines, at a step S101, whether the extension interface 19 has received a control signal from the extension interface 34 of the main control unit 30. If the control signal is not received, it is determined at a step S102 whether a key input has been made from the keyboard 16. If there is no key input, the program returns to the step S101.

If there is a key input from the keyboard 16, the program proceeds from the step S102 to a step S103, where it is determined whether there is a key input from the personal computer communication changeover key 16a. If there is no input from the personal computer communication changeover key 16a, the program proceeds to a step S105; if there is an input from this key, the program proceeds to a step S104. Here the controller 11 informs the main control unit 30, via the extension interface 19, of the fact that an input has been made from the personal computer communication changeover key 16a. This is followed by a step S105 where, if there is another key input, the corresponding processing for this key input is executed. At the end of this corresponding processing, the program returns to the step S101 to prepare for the next key input. As an example of corresponding processing, assume that the handset 18 is taken off the hook and a telephone number key is pressed. In such case a corresponding telephone number signal (e.g., a DTMF signal) is transmitted. If there is an input from an abbreviated dialing key or an input from a single-touch dialing key, the corresponding control signal is transmitted.

If it is determined at the step S101 that a control signal has arrived from the main control unit 30, the program proceeds from the step S101 to a step S110, where it is checked to see whether the received control signal is a telephone call signal. If the received signal is not a call signal, the program proceeds to a step S112; if it is a call signal, the program proceeds to a step S111, at which a well-known ringing tone is outputted by a ringing tone output unit of the display 17, thereby informing of the call from the line. The program then proceeds to the step 112, at which it is determined whether the signal is a signal for activating the personal computer communication lamp 17a. If this is the case, the lamp 17a is lit at a step S113, after which the program proceeds to a step S114. Here it is determined whether the signal received is one for deactivating the personal computer communication lamp 17a. If it is, the program proceeds to a step S115, where the lamp 17a is extinguished, followed by the program proceeding to a step S120.

If the received control signal is found not to be the personal computer communication lamp extinguishing signal at the step S114, then the program proceeds to the step S120, where processing corresponding to the received control signal is executed. The program then returns to the step S101.

In accordance with the embodiment described above, when a call is intended for the personal computer 60, the CST signal detecting circuit provided in the main control unit 30 automatically detects the CST signal and forms a channel between the called line and the extension C1 to which the personal computer 60 is connected. Thus, there is provided a telephone system in which a channel can be formed with the personal computer 60 rapidly without performing troublesome transfer processing or the like, and in which there are no inconveniences such as line disconnection due to expiration of time on the calling side.

It should be noted that it is possible to adopt an arrangement in which, when the personal computer communication lamp 17a is activated, the lamp can be made to flash rather than stay lit. This has the effect of attracting the operator's attention more easily.

Third Embodiment

In the second embodiment set forth above, that when the main control unit 30 detects a call, a call signal is outputted to an extension telephone, a response from the telephone is awaited and then the CST signal detecting circuit is started. However, the invention is not limited to such an embodiment. It is possible to adopt an arrangement in which, when two consecutive calling signals, by way of example, are detected from a line, a call signal is outputted to a telephone, a response is made by forming a DC loop with the line on which the calling signal is detected, and the CST signal detecting circuit is started to perform CST signal detection processing.

Further, it can be arranged so that the call signal is outputted to an extension telephone only when the CST signal is not detected, rather than outputting the call signal to the extension telephone before the end of the five-second CST signal detection processing. In this case, it is preferred that the caller be informed of the fact that a call is in progress.

Fourth Embodiment

It is described above that when communication with the personal computer is in effect, the main control unit 30 automatically forms a channel between the line on which the CST signal is detected and the extension C1, thereby making communication between the two lines possible. However, the invention is not limited to this, for it is permissible to adopt control in which a channel is formed between the called line and the personal computer 60 only after a command for connection with the personal computer 60 is received from the operator.

Figure 9A:
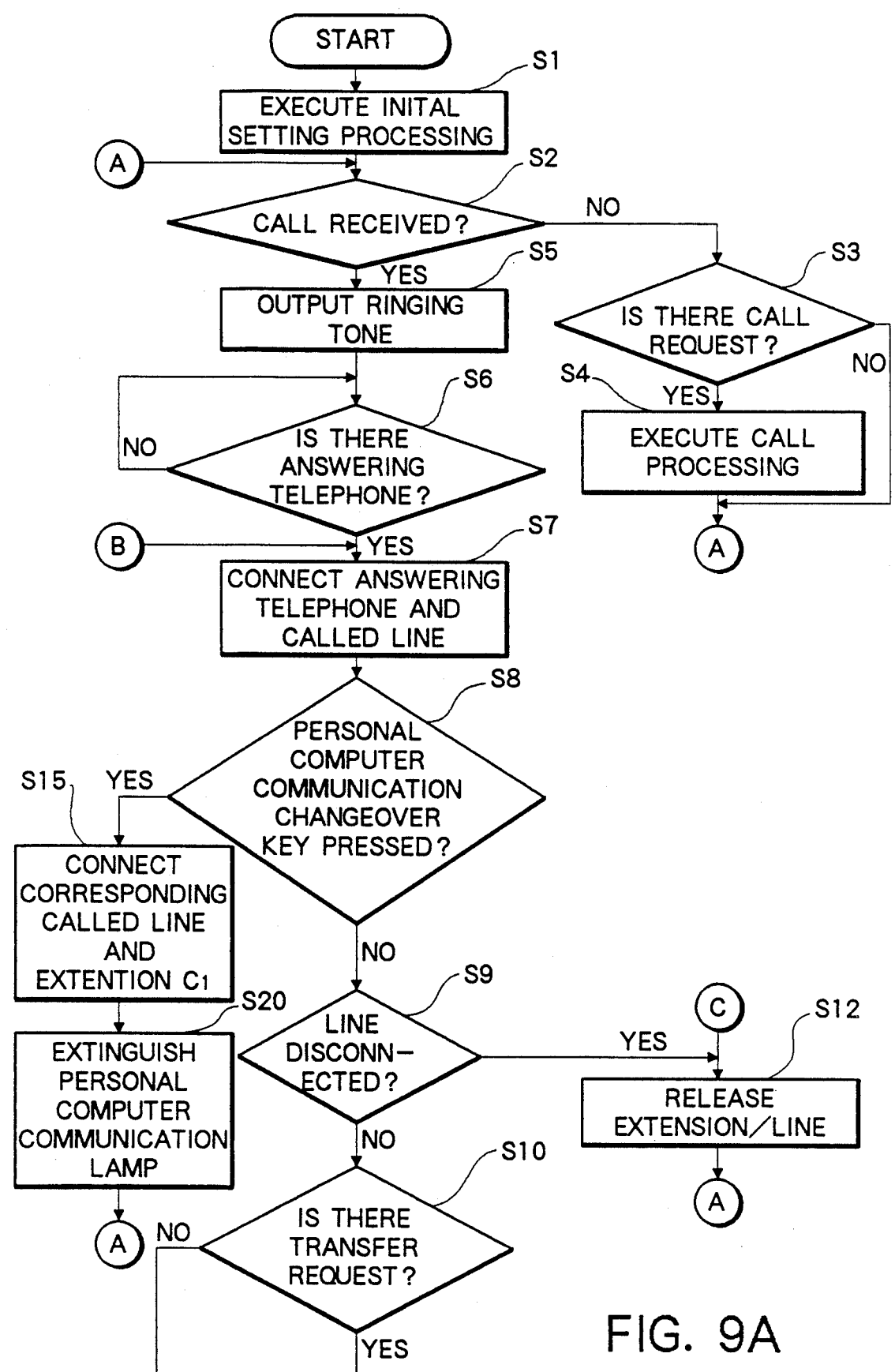
FIGS. 9A and 9B, are control flowchart of a main control unit of a fourth embodiment of the invention.
Figure 9B:
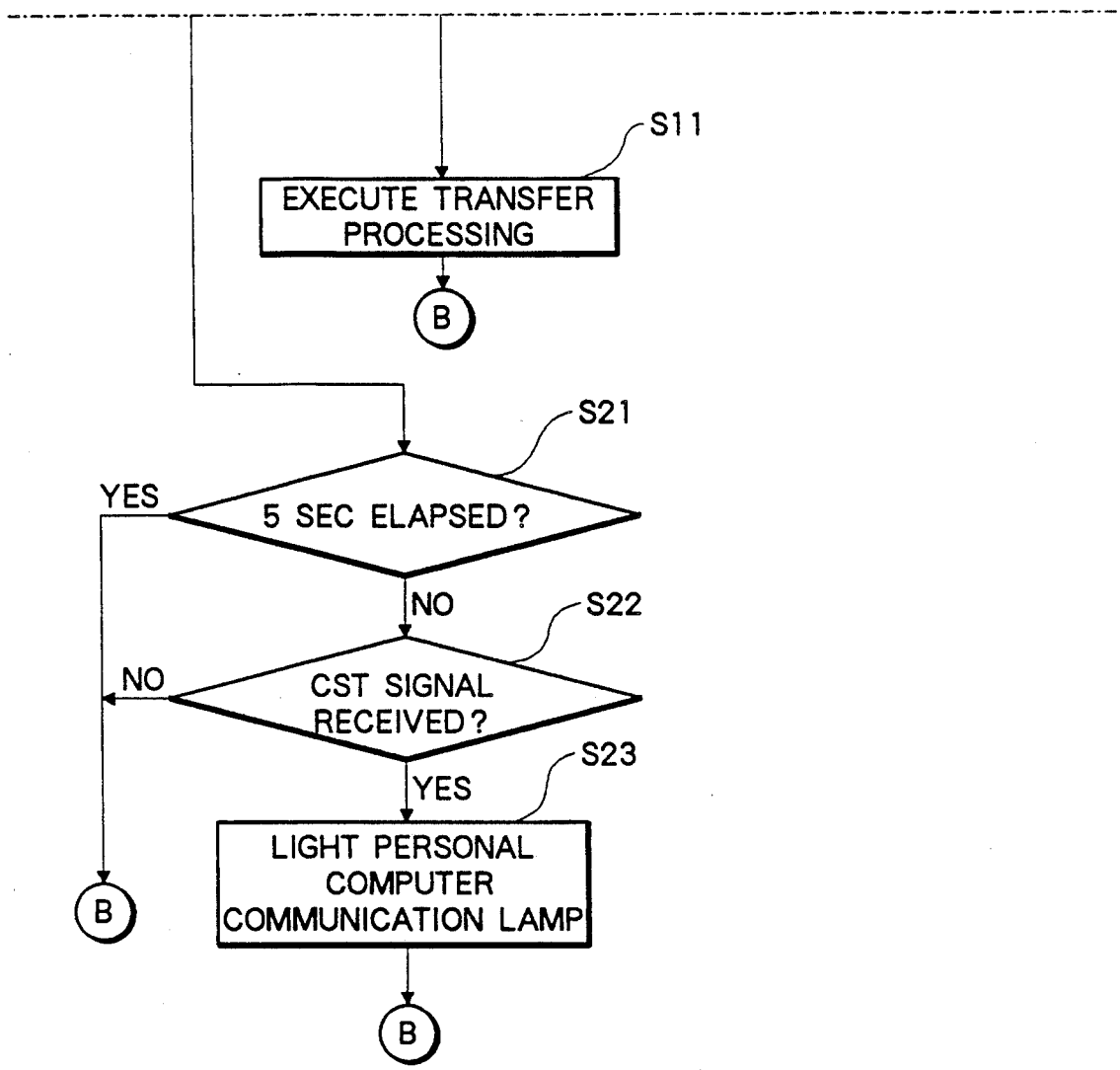

The control flowchart of the main control unit in this case is shown in FIGS. 9A and 9B, in which steps similar to those in FIGS. 7A and 7B are designated by like reference characters and need not be described again.

In FIGS. 9A and 9B, if the CST signal is detected before five seconds elapse following a response to a called line, the personal computer communication lamp 17a of the telephone is lit or caused to flash at a step S23, thereby prompting the responding party to make an input designating connection to the personal computer 60. The program the returns to the step S7, at which an input from the personal computer communication changeover key 16a is awaited. When a call requesting communication with the personal computer 60 is detected by looking at the personal computer communication lamp 17a, the personal computer communication changeover key 16a of the telephone is pressed. As a result, the program proceeds from step S8 to step S15, where the line on which the CST signal is detected and the extension C1 are connected to make communication possible, just as in FIGS. 7A and 7B. Next, the personal computer communication lamp 17a of the telephone is extinguished at step S25 and the program returns to the step S7, after which the end of data communication with the personal computer 60 is awaited.

Even control performed in this manner allows an incoming call for the personal computer 60 to be connected without inconvenience.

Fifth Embodiment It is described above that the CST signal detecting circuit shown in FIG. 6 is provided within the main control unit 30. However, an arrangement can be adopted in which this circuit can be provided in a specific telephone or in all of the telephones, with the CST detection signal 112 being outputted to the controller 11.

Figure 5:
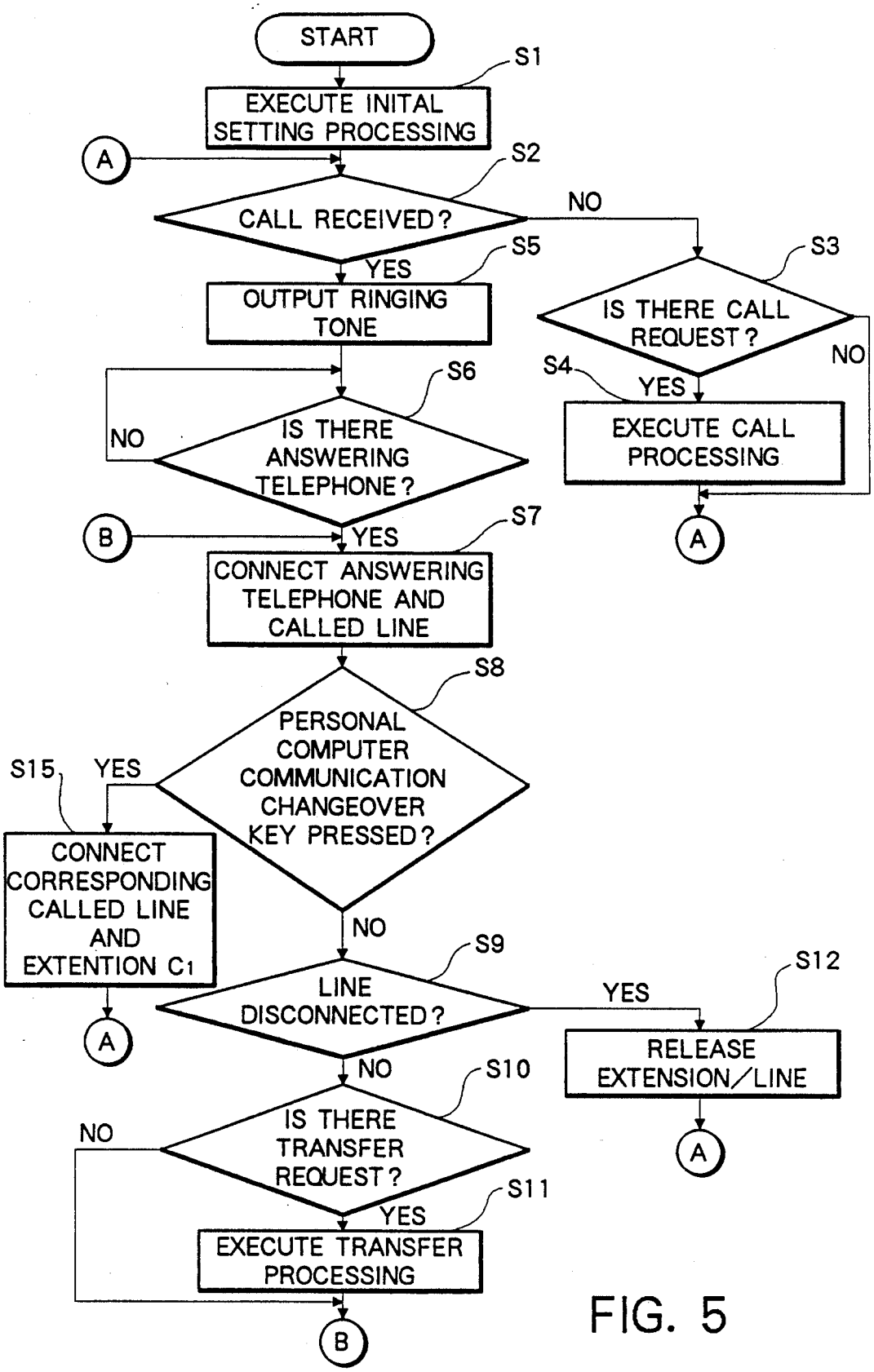
FIG. 5 is a control flowchart of the main control unit of the first embodiment.

In this case, control performed by the main control unit 30 would be as shown in FIG. 5. In the telephone equipped with the CST signal detecting circuit, a period of five seconds is set in the timer 105 when a response, which is made by taking the handset 18 off the hook in answer to a call, is detected. Then it is determined whether the CST detection signal 112 is outputted before elapse of the five-second period. If this signal is not outputted, ordinary call processing is executed.

When the CST signal is outputted, the personal computer communication lamp 17a of the telephone is lit or made to flash, thereby prompting the responding party to make an input designating connection to the personal computer 60. This is done by pressing the personal computer communication changeover key 16a. When a call requesting communication with the personal computer 60 is detected by looking at the personal computer communication lamp 17a, the personal computer communication changeover key 16a of the telephone is pressed. When the controller 11 detects this input from the personal computer communication changeover key 16a, the central controller 31 is so informed via the extension interfaces 19, 34, and the central controller 31 executes the processing of step S15 in FIG. 5.

Meanwhile, the lit personal computer communication lamp 17a on the telephone side is extinguished to prompt the operator to hang up the handset 18 of the telephone.

If, at this time, the telephone number of the extension connected to the personal computer is not held by the main control unit 30 but is held by the telephone having the CST signal generating circuit, it will suffice to output to the main control unit 30 the telephone number of the extension connected to the personal computer 60 of this telephone along with the input from the personal computer communication changeover key 16a. In this case, the main control unit 30 connects the call, which is connected to the extension that has received the signal from the personal computer communication changeover key, to another designated extension. Even in this case, however, it is unnecessary to check the numbers of the extensions connected to the personal computer 60 and to input these numbers. The personal computer 60 can be connected to the desired calling party rapidly by a simple, single touch of a single key, thereby making data transmission possible.

In accordance with the present invention as described above, an information processor and a telephone can be connected to a common central office network line, and a call responded to at another telephone can be connected to a desired information processor rapidly through a simple operation.

Accordingly, it is unnecessary to assign a special-purpose central office network line to an information processor. When the information processor is not in use, therefore, another telephone may employ the line. This improves the efficiency of line utilization.

Sixth Embodiment

In the foregoing, a system has been described in which it is determined whether a call from a line is an incoming call to a telephone or an incoming call for a data communication device. By carrying out the following control with respect to an incoming call that has been thus identified or an incoming call before it is identified, communication control can be performed through a communication control procedure best suited to the data communication device.

The following description of a sixth embodiment will deal with a communication system having a communication control function, which uses a communication procedure in accordance with the JUST-PC communication system, as a personal computer communication control function, and a communication control function, which uses a GIII-facsimile communication procedure in accordance with Advisory T.30 of the International Telegraph and Telephone Consultative Committee (C.C.I.T.T.), as a facsimile communication control function.

Figure 10:
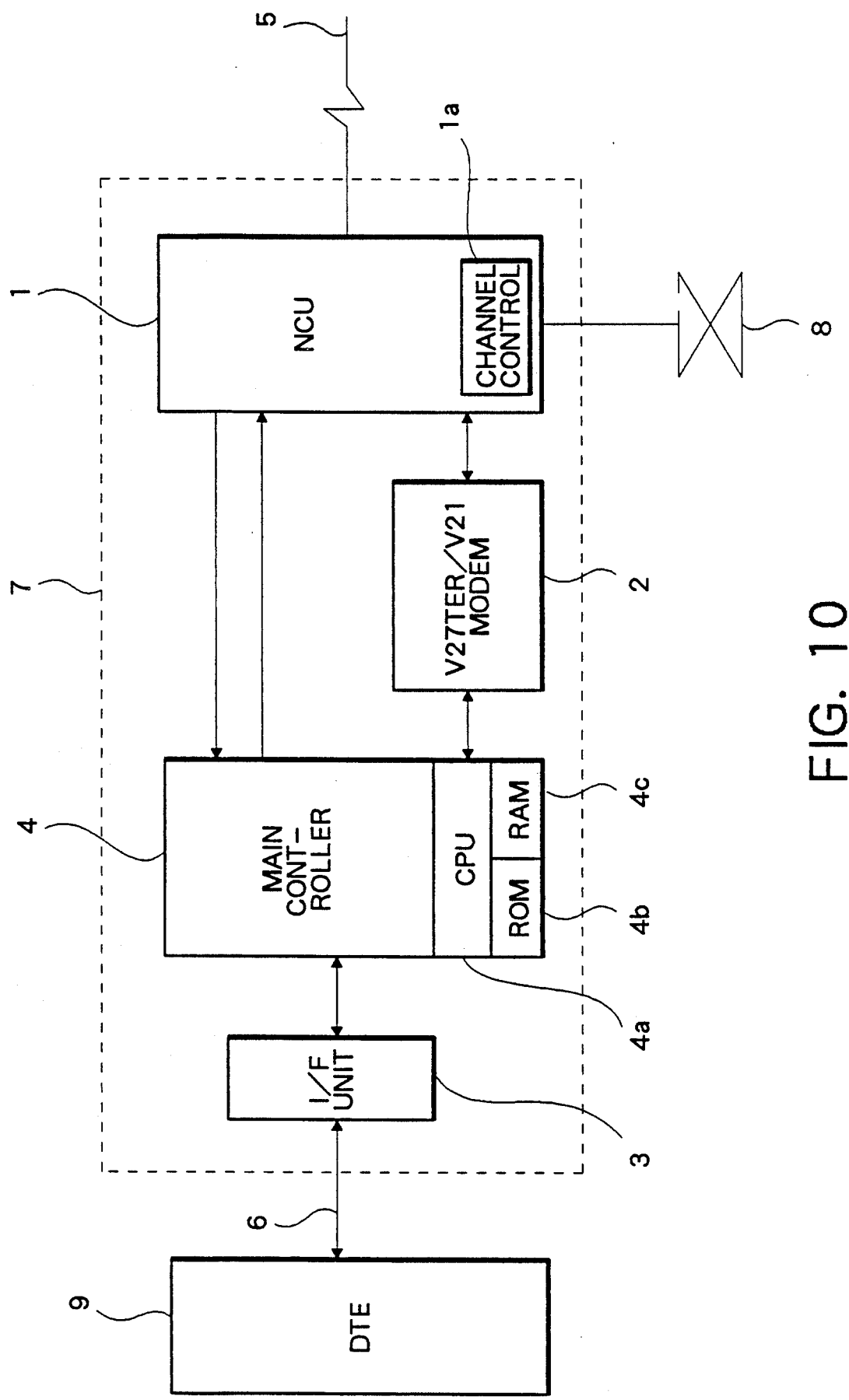
FIG. 10 is a block diagram illustrating the arrangement of an apparatus according to a sixth embodiment of the present invention.

FIG. 10 is a block diagram showing the principal portion of a communication system according to this embodiment of the invention. In FIG. 10, numeral 1 denotes a network control unit (NCU) for interfacing a telephone line 5 in accordance with control from a main controller 1. The NCU 1 has a built-in channel controller 1a and is adapted to detect an incoming call from the telephone line 5, execute call control, secure a line at the time of call control, and effect a line changeover between a telephone 8 and a modem 2. The NCU 1 outputs a required status signal to the main controller 4. For example, when a call is detected from the telephone line, a call signal is outputted to the main controller 4.

Figure 11:
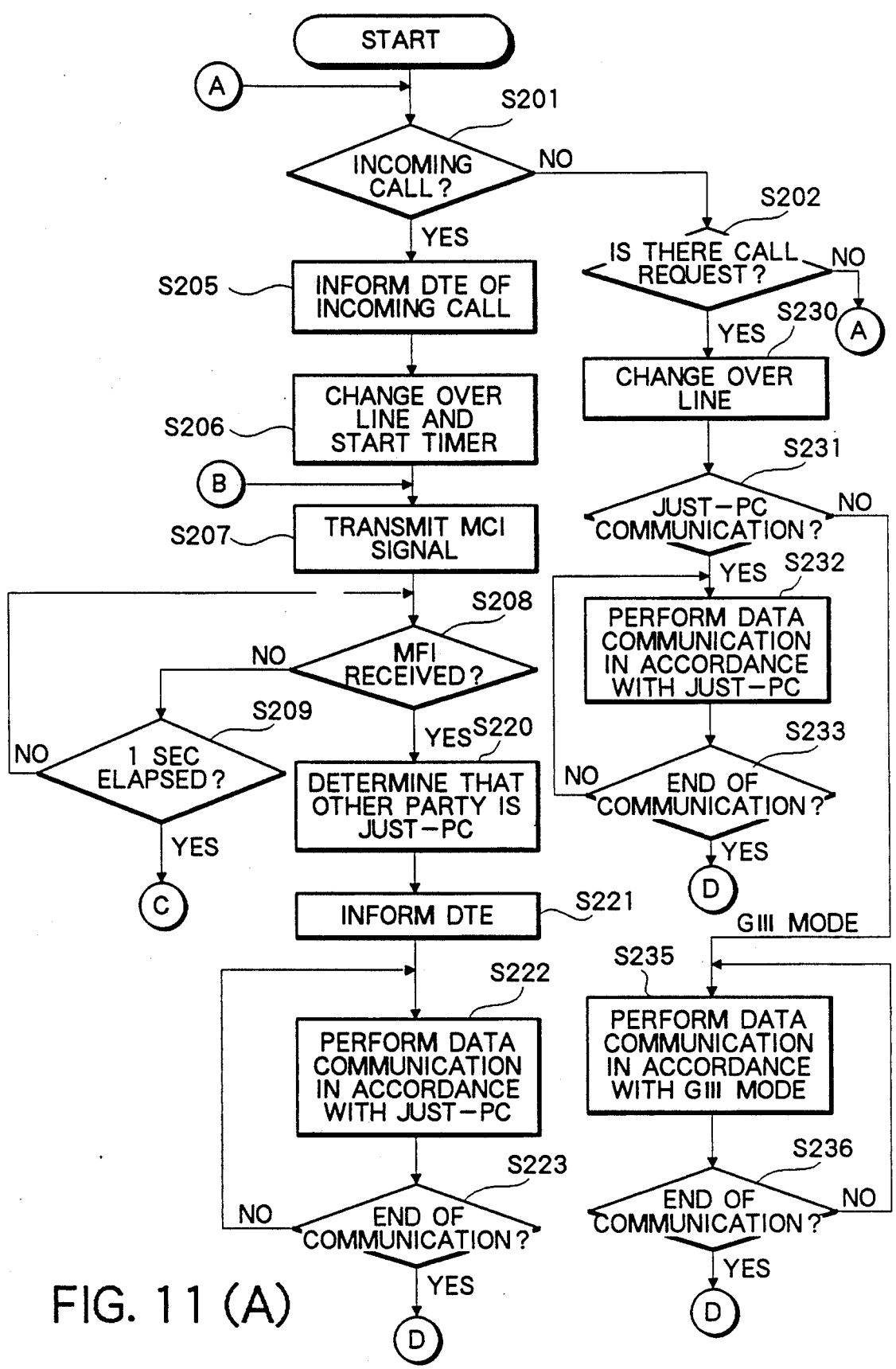
FIGS. 11(A) and 11(B) are control flowcharts of the sixth embodiment.
Figure 11:
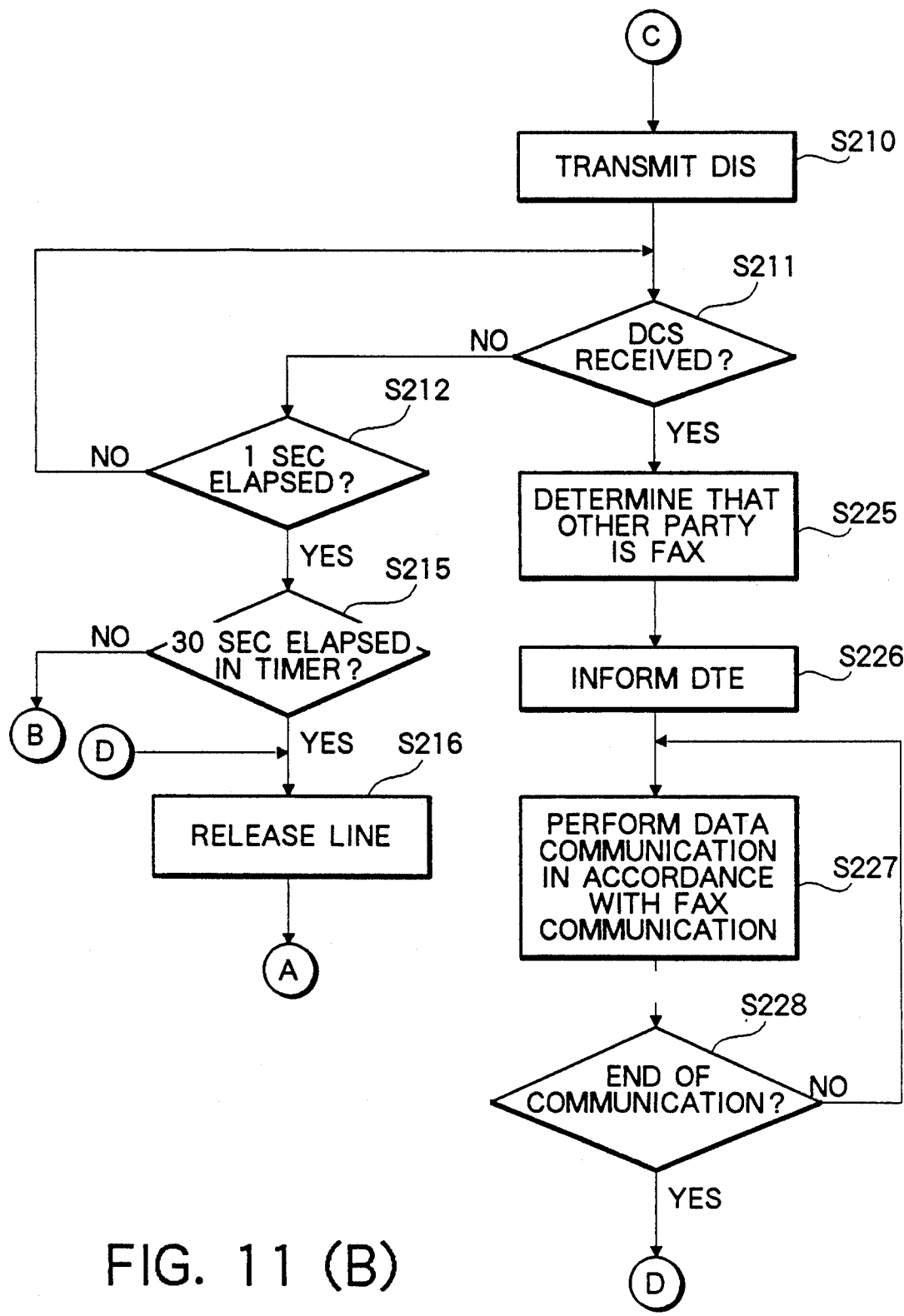

The modem 2 has a transmission speed of 4800/2400 bps in accordance with Advisory V27 of the C.C.I.T.T., and a transmission speed of 300 bps in accordance with Advisory V21 of the C.C.I.T.T. The modem 2 executes modulation and demodulation of received data in accordance with control signals that conform to these advisories. More specifically, the modem 2 accepts a signal from the telephone line 5 via the NCU 1, demodulates the received data, sends a control signal to the main controller 4, modulates received data from the main controller 4 and sends the modulated data to the other party. Numeral 3 denotes an interface (hereinafter referred to as an "I/F unit") for interfacing a data terminal (hereinafter referred to as a "DTE"), which is connected to the device 7 of this embodiment, in accordance with control exercised by the main controller 4. The I/F unit 3 converts the transmission data from the main controller 4 into a signal conforming to the RS-232C specifications of the Electronic Instruments Association (EIA) of the United States, transfers the signal to the DTE 9 via a connecting line 6, reconverts the signal conforming to the RS-232c specifications from the DTE 9 and transfers the result to the main controller 4. The latter controls the overall device 7 of this embodiment. The main controller 4 includes a CPU 4a, a ROM 4b and a RAM 4c. In accordance with a program such as shown in FIGS. 11(A) and 11(B), described below, stored in the ROM 4b, the main controller 4 performs data communication control under a communication control procedure in accordance with the JUST-PC communication system and under a GIII facsimile communication control procedure, as will be described later.

These procedures are stored in the ROM 4b and are selectively executed in accordance with the communication control procedure of the other party's device. The main controller 4 can be formed by a single-chip microcomputer.

Figure 12:
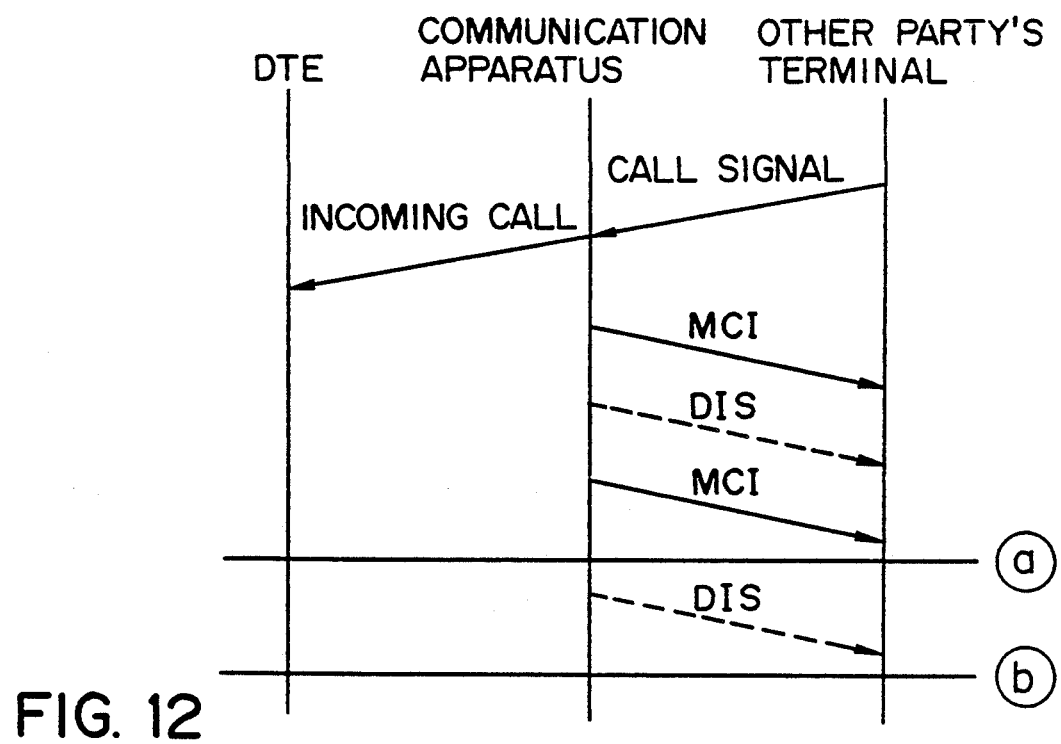
FIGS. 12, 13 and 14 are views showing communication control procedure sequences of the sixth embodiment.
Figure 13:
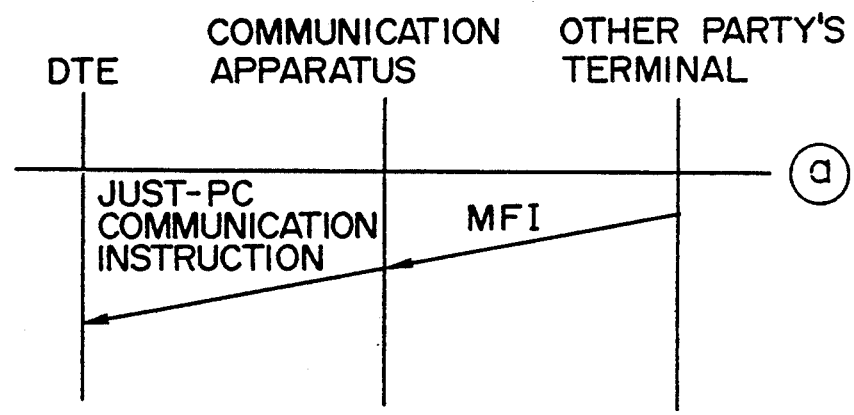
Figure 14:
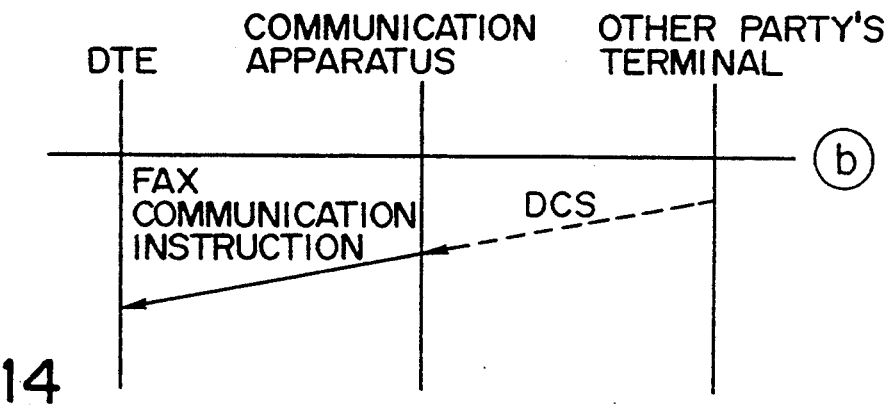

The operation of this embodiment constructed as set forth above will now be described with reference to the control flowcharts of FIGS. 11(A) and 11(B) and FIGS. 12 through 16(B). FIGS. 12, 13 and 14 are views showing communication control sequences of the sixth embodiment, FIGS. 15(A) and 15(B) are views showing the signal format and communication speed of a communication control signal related to JUST-PC communication and FIGS. 16(A) and 16(B) are views showing a control signal format and communication speed of a communication control signal related to facsimile communication.

Monitoring is performed at a step S202 to determine if there is an incoming call from the telephone line 5, and at a step S202 to determine if there is a data transmission request from the DTE 9 via the I/F unit 3.

If a call is placed to the apparatus of this embodiment from another party's terminal, a call signal (incoming signal) from the telephone network is received via the telephone line 5, as shown in FIG. 12. When the NCU 1 detects this call signal from the telephone line 5, it sends a call detection signal to the main controller 4. When the main controller 4 receives this signal, processing proceeds from the step S201 to a step S205, where the incoming signal is transmitted to the DTE 9 via the I/F unit 3. Also, the NCU 1 is controlled at a step S206 to change over the telephone line 5, which until now has been connected to the telephone 8, to the modem 2. A response is made to the call and line acquisition is carried out as by forming a DC loop with the line. The main controller 4 starts an internal timer A at this time. It possible to adopt an arrangement in which control is performed in such a manner that the response to the call is made when the call signal is detected a predetermined number of times (e.g., three), thus providing an opportunity to respond to the call from the line 5 by means of the telephone 8.

Next, at a step S207, a modem function display signal (hereinafter referred to as an "MCI" signal) of the JUST-PC communication control signal is transmitted from the modem 2 via the NCU 1 at a transmission speed of 2400 bps (V27 ter). Monitoring is then performed for one second at steps S208, S209 to determine whether a modem function communication signal (hereinafter referred to as an "MFI" signal), which is an answer signal, has been received from the other party's communication terminal.

The MCI signal format and the MFI signal format used in JUST-PC communication control of this embodiment are as shown in FIGS. 15(A) and 15(B), respectively. In these Figures, "F" represents a flag field, "A" an address field, "C" a control field, "TIF" a terminal function information field, and "FCS" a flag check sequence. The "training" field of the MFI signal can include the echo of the speaker.

If the MFI signal from the other party's communication terminal at the communication speed of 2400 bps (V27 ter) is not received even upon elapse of one second from transmission of the MCI signal, the program proceeds to a step S210, where the digital identification signal (DIS) of the facsimile communication control signal is sent from the modem 2 to the other party's communication terminal via the NCU 1 at a communication speed of 300 bps (V21). Monitoring is then performed for one second at steps S211, S212 to determine whether a digital command signal (DCS), which is an answer signal, has been received from the other party's communication terminal.

The DIS format and the DCS format used in GIII facsimile communication procedure control of this embodiment are as shown in FIGS. 16(A) and 16(B), respectively.

If the DCS from the other party's communication terminal at the communication speed of 300 bps (V21) is not received even upon elapse of one second from transmission of the DIS, the program proceeds to a step S215, at which it is determined whether the timer A has clocked a predetermined time period (30-40 sec), namely whether the MFI signal or DCS cannot be received by expiration of the predetermined time period (30-40 sec) from the moment the initial MCI signal is transmitted. If the timer A has not clocked the predetermined time period (30-40 sec), then the program returns to the step S207 and control identical with that just described is repeated. That is, the program proceeds to execution of control for sending the MCI signal and awaiting the arrival of the MFI signal from the other party. This control sequence is shown in FIG. 12.

The above-described control sequence is executed until 30-40 sec elapse from the initial MCI signal transmission, depending upon arrival of the MFI signal or DCS, and alternate transmission of the MCI signal and DIS is repeated. If the main controller 4 cannot receive the MFI signal or DCS within this predetermined time period, the program proceeds from the step S215 to a step S216, where the NCU 1 is instructed to connect the telephone line 5, which is connected to the modem 2, to the telephone 8, and the line is released by sending a line release instruction to the NCU 1. The program then returns to the step S201.

In a case where the MFI signal is received during the monitoring operation of steps S208, S209, i.e., if the communication apparatus 7 receives the MFI signal from the other party's communication terminal, as shown in FIG. 13, at the point in time (a) of the control sequence of FIG. 12, the program proceeds from the step S208 to a step S220, where the main controller 4 determines that the other party's communication terminal is a terminal equipped with the JUST-PC communication control procedure. Next, at a step S221, JUST-PC communication instruction data, which indicates that the other party's communication terminal is a device having the personal computer communication control procedure, is sent to the DTE 9 via the I/F unit 3 and connecting line 6. Thereafter, at steps S222 and S223, a data communication is made with the other party's communication terminal (personal computer) through a transmission control procedure in accordance with the JUST-PC communication control procedure. The program returns to the step S216 when the communication ends.

In a case where the MCS is received during the monitoring operation of steps S211, S212, i.e., if the communication apparatus 7 receives the DSC from the other party's communication terminal, as shown in FIG. 13, at the point in time (b) of the control sequence of FIG. 12, the program proceeds from the step S211 to a step S225, where the main controller 4 determines that the other party's communication terminal is a terminal equipped with the facsimile communication control procedure. Next, at a step S226, facsimile communication instruction data, which indicates that the other party's communication terminal is a device having the facsimile communication control procedure, is sent to the DTE 9 via the I/F unit 3 and connecting line 6. Thereafter, at steps S227 and S228, a data communication is made with the other party's communication terminal (facsimile communication apparatus) through a transmission control procedure in accordance with the GIII facsimile communication control procedure. The program returns to the step S216 when the communication ends.

When a data transmission request is issued by the DTE 9, the program proceeds from the step S202 to a step S230, where the NCU 1 is controlled to switch over the telephone line 5, which until now has been connected to the telephone 8, to the modem 2. A line is acquired as by forming a DC loop with a line. It is then determined at a step S231 whether the designated communication control procedure from the DTE 9 is the JUST-PC communication control procedure. If this is the case, the program proceeds to steps S232, S233, where communication is carried out through the JUST-PC communication control procedure. When communication ends, the program proceeds to a step S216.

If it is found at the step S231 that the procedure is the facsimile communication control procedure and not the JUST-PC communication control procedure, the program proceeds from the step S231 to steps S235, S236, where data communication is performed through a transmission control procedure in accordance with the facsimile communication control procedure. The program returns to the step S216 when the communication ends.

In accordance with the present embodiment as described above, after a call is automatically received in a communication apparatus having a plurality of communication procedure control means, a first communication procedure control signal and a second communication procedure control signal are alternately transmitted to another party's communication terminal and a communication control procedure signal is received from the other party's communication terminal, thereby making it possible to discriminate the communication control system possessed by the other party's communication terminal.

Consequently, an advantage of this embodiment is that communication conforming to each of the communication systems is possible even when calls are received from other party's communication terminals having different communication control systems.

As many apparently widely different embodiments of the present invention can be made without departing from the spirit and scope thereof, it is to be understood that the invention is not limited to the specific embodiments thereof except as defined in the appended claims.

What is claimed is:

1. A system of communication devices capable of being connected to other communication devices via a communication medium, comprising:
   first communication procedure control means for performing communication control through a first communication procedure;
   second communication procedure control means for performing communication control through a second communication procedure different from that of said first communication procedure;
   control signal transmitting means for alternately transmitting a communication control signal in accordance with said first communication procedure and a communication control signal in accordance with said second communication procedure; and
   discriminating means for discriminating a communication control procedure of another party's communication device based on a transmitted control signal from the other party's communication device;
   wherein data communicated by said first communication procedure and data communicated by said second communication procedure are data of different types, and
   after communication control signal in accordance with with first communication procedure is transmitted, said discriminating means discriminates whether a response signal corresponding to the transmitted communication in accordance with said first communication procedure is received within a predetermined time, transmits the communication control signal in accordance with said second communication procedure by said control signal transmitting means if the response signal is not received within the predetermined time, discriminates whether a response signal corresponding to the transmitted communication control in accordance with said second communication procedure is received within a predetermined time, and alternately transmits the communication control signal in accordance with said first communication procedure and the communication control signal in accordance with said second communication procedure.

2. The system according to claim 1, wherein said first and second communication control procedures are a personal computer communication control procedure and a facsimile communication control procedure.

3. The system according to claim 2, wherein the first and second communication control procedures are a code data communication control procedure and an image data communication control procedure.

4. The system according to claim 1, wherein said control signal transmitting means is started when there is a communication request from another party's communication device.

5. The system according to claim 5, wherein the first and second communication control procedures are a code data communication control procedure and an image data communication control procedure.

6. A communication control apparatus comprising:
   first communication procedure control means for performing communication control through a first communication procedure;
   second communication procedure control means for performing communication control through a second communication procedure different from that of said first communication procedure;
   control signal transmitting means for alternately transmitting a communication control signal in accordance with said first communication procedure and a communication control signal in accordance with said second communication procedure;
   discriminating means for discriminating a communication control procedure of another party's communication device based on a transmitted control signal from the other party's communication device;
   receiving means for selecting either said first communication procedure or said second communication procedure in accordance with results of discrimination by said discriminating means, and receiving data from the other party's communication device in accordance with the selected communication procedure; and
   transmitting means for transmitting the data received by said receiving means to a second other communication device different from the other party's communication device,
   wherein data communicated by said first communication procedure and data communicated by said second communication procedure are data of different types, and
   after the communication control signal in accordance with said first communication procedure is transmitted, said discriminating means discriminates whether a response signal corresponding to the transmitted communication control in accordance with said first communication procedure is received within a predetermined time, transmits the communication control signal in accordance with said second communication procedure by said control signal transmitting means if the response signal is not received within the predetermined time, and alternately transmits the communication control signal in accordance with said first communication procedure and the communication control signal in accordance with said second communication procedure.

7. The communication control apparatus according to claim 6, wherein data received by said first communication procedure and data received by said second communication procedure are data of different types.

8. The communication control apparatus according to claim 6, wherein said first and second communication control procedures are a personal computer communication control procedure and a facsimile communication control procedure.

* * * * *

UNITED STATES PATENT AND TRADEMARK OFFICE
CERTIFICATE OF CORRECTION

PATENT NO. : 5,001,744

DATED : March 19, 1991

INVENTOR(S) : TSUTOMU NISHINO, ET AL.

It is certified that error appears in the above-identified patent and that said Letters Patent is hereby corrected as shown below:

Title Page:

IN [54] TITLE

"A" should be deleted.

IN [56] REFERENCES CITED

OTHER PUBLICATIONS, "Communications Series" should read --Communications Services--.

COLUMN 1

Line 1, "A" should be deleted.

COLUMN 15

Line 44, "with with" should read --with said--.
Line 47, "communication" should read --communication control--.

Line 43, after "after" insert --the--.

UNITED STATES PATENT AND TRADEMARK OFFICE
CERTIFICATE OF CORRECTION

PATENT NO. : 5,001,744

DATED : March 19, 1991

INVENTOR(S) : TSUTOMU NISHINO, ET AL.

It is certified that error appears in the above-identified patent and that said Letters Patent is hereby corrected as shown below:

COLUMN 16

Line 7, "claim 5," should read --claim 1,--.

Signed and Sealed this

Twenty-fifth Day of May, 1993

Attest:

MICHAEL K. KIRK

Attesting Officer

Acting Commissioner of Patents and Trademarks